(12) United States Patent
Discekici et al.

(10) Patent No.: US 12,280,543 B2
(45) Date of Patent: Apr. 22, 2025

(54) THREE-DIMENSIONAL PRINTING WITH DUCTILITY AGENTS

(71) Applicant: PERIDOT PRINT LLC, Palo Alto, CA (US)

(72) Inventors: Emre Hiro Discekici, San Diego, CA (US); Dennis J. Schissler, San Diego, CA (US); Shannon Reuben Woodruff, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 29 days.

(21) Appl. No.: 18/271,219

(22) PCT Filed: Jan. 11, 2021

(86) PCT No.: PCT/US2021/012885
§ 371 (c)(1),
(2) Date: Jul. 6, 2023

(87) PCT Pub. No.: WO2022/150045
PCT Pub. Date: Jul. 14, 2022

(65) Prior Publication Data
US 2024/0059009 A1   Feb. 22, 2024

(51) Int. Cl.
*B29C 64/165*    (2017.01)
*B29K 105/00*    (2006.01)
(Continued)

(52) U.S. Cl.
CPC .......... *B29C 64/165* (2017.08); *B33Y 10/00* (2014.12); *B33Y 70/00* (2014.12); *B29K 2105/0038* (2013.01)

(58) Field of Classification Search
CPC ....... B29C 64/165; B33Y 10/00; B33Y 70/00; B29K 2105/0038
See application file for complete search history.

(56) References Cited

U.S. PATENT DOCUMENTS 10,647,053 B2    5/2020   Erickson et al.
11,780,988 B2 *  10/2023  Woodruff ................ C08L 77/02
                                                      264/497
(Continued)

FOREIGN PATENT DOCUMENTS

CN    104629152 B    3/2017
CN    106566273 A    4/2017
(Continued)

*Primary Examiner* — Nahida Sultana
(74) *Attorney, Agent, or Firm* — HP Inc. Patent Department (57) ABSTRACT

The present disclosure describes multi-fluid kits for three-dimensional printing, three-dimensional printing kits, and methods of three-dimensional printing. In one example, a multi-fluid kit for three-dimensional printing can include a fusing agent and a ductility agent. The fusing agent can include water and electromagnetic radiation absorber. The electromagnetic radiation absorber can absorb radiation energy and convert the radiation energy to heat. The ductility agent can include water, a water-soluble pore-generating compound that chemically reacts at an elevated temperature to generate a gas, and a plasticizer. The plasticizer can have formula (I) wherein n is an integer ranging from 3 to 8; or formula (II) wherein m is an integer ranging from 3 to 8.

$$HO\left[\phantom{x}\phantom{x}\phantom{x}O\right]_n H \quad (I)$$

$$HO\left[\phantom{x}\phantom{x}\phantom{x}\phantom{x}O\right]_m H \quad (II)$$

15 Claims, 5 Drawing Sheets

(51) Int. Cl.
  *B33Y 10/00* (2015.01)
  *B33Y 70/00* (2020.01)

(56) References Cited

U.S. PATENT DOCUMENTS

2016/0333153 A1\* 11/2016 Hirata .................. B29C 64/153
2021/0238414 A1\* 8/2021 Woodruff ............... C08G 69/14

FOREIGN PATENT DOCUMENTS

| WO | 2020/086074 A1 | 4/2020 |
| WO | 2020/086076 A1 | 4/2020 |
| WO | 2020/190334 A1 | 9/2020 |
| WO | 2020/251917 A1 | 12/2020 |

\* cited by examiner

THREE-DIMENSIONAL PRINTING WITH DUCTILITY AGENTS

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Accordingly, it can be difficult to print 3D functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

The present disclosure describes multi-fluid kits for three-dimensional printing, three-dimensional printing kits, and methods of three-dimensional printing that include a ductility agent capable of increasing the ductility of three-dimensional printed materials. In one example, a multi-fluid kit for three-dimensional printing includes a fusing agent and a ductility agent. The fusing agent includes water and an electromagnetic radiation absorber. The electromagnetic radiation absorber absorbs radiation energy and converts the radiation energy to heat. The ductility agent includes water, a water-soluble pore-generating compound that chemically reacts at an elevated temperature to generate a gas, and a plasticizer. The plasticizer has either formula (I):

wherein n is an integer ranging from 3 to 8; or formula (II):

wherein m is an integer ranging from 3 to 8. In some examples, the pore-generating compound can be carbohydrazide, urea, methylurea, dimethylurea, a carbamide-containing compound, ammonium carbonate, ammonium nitrate, ammonium nitrite, sodium bicarbonate, potassium bicarbonate, a biuret, or a combination thereof. In further examples, the elevated temperature at which the pore-generating compound chemically reacts can be from about 70° to about 250° C. In certain examples, the pore-generating compound can be present in the ductility agent in an amount from about 0.5 wt % to about 10 wt %, based on a total weight of the ductility agent. In a particular example, the plasticizer can have formula (I) and n can be 4 or 5. In another particular example, the plasticizer can have formula (II) and m can be 5. In further examples, the plasticizer can be present in the ductility agent in an amount from about 1 wt % to about 35 wt %, based on a total weight of the ductility agent.

The present disclosure also describes three-dimensional printing kits. In one example, a three-dimensional printing kit includes a powder bed material and a ductility agent. The powder bed material includes polymer particles. The ductility agent includes water, a water-soluble pore-generating compound that chemically reacts at an elevated temperature to generate a gas, and a plasticizer. The plasticizer has either formula (I):

wherein n is an integer ranging from 3 to 8, or formula (II):

wherein m is an integer ranging from 3 to 8. In some examples, the polymer particles can include polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof. In further examples, the pore-generating compound can be carbohydrazide, urea, methylurea, dimethylurea, a carbamide-containing compound, ammonium carbonate, ammonium nitrate, ammonium nitrite, sodium bicarbonate, potassium bicarbonate, a biuret, or a combination thereof, and the pore-generating compound can be present in the ductility agent in an amount from about 0.5 wt % to about 10 wt %, based on a total weight of the ductility agent. In other examples, the plasticizer can have formula (I) and n can be 4 or 5, or the plasticizer can have formula (II) and m can be 5, and the plasticizer can be present in the ductility agent in an amount from about 1 wt % to about 35%, based on a total weight of the ductility agent. In still other examples, the ductility agent can also include an electromagnetic radiation absorber, or the three-dimensional printing kit can also include a fusing agent that includes water and an electromagnetic radiation absorber, wherein the electromagnetic radiation absorber absorbs radiation energy and converts the radiation energy to heat.

The present disclosure also describes methods of three-dimensional printing. In one example, a method of three-dimensional printing includes iteratively applying individual build material layers of polymer particles to a powder bed. A fusing agent is selectively jetted onto the individual build material layers, based on a three-dimensional object model. The fusing agent includes water and a radiation absorber. A ductility agent is also selectively jetted onto the individual build material layers based on the three-dimensional object model. The ductility agent includes water, a water-soluble pore-generating compound that chemically reacts at an elevated temperature to generate a gas, and a plasticizer. The plasticizer has either formula (I):

(I)

wherein n is an integer ranging from 3 to 8, or formula (II):

(II)

wherein m is an integer ranging from 3 to 8. The method also includes exposing the powder bed to energy to selectively fuse the polymer particles in contact with the radiation absorber to form a fused polymer matrix at individual build material layers, thereby heating the pore-generating compound to the elevated temperature to generate the gas distributed in the fused polymer matrix. In some examples, the gas can form isolated pores in the fused polymer matrix, and the pores can have an average diameter from about 1 micrometer to about 1 millimeter. In further examples, the pore-generating compound can be carbohydrazide, urea, methylurea, dimethylurea, a carbamide-containing compound, ammonium carbonate, ammonium nitrate, ammonium nitrite, sodium bicarbonate, potassium bicarbonate, a biuret, or a combination thereof, and the pore-generating compound can be present in the ductility agent in an amount from about 0.5 wt % to about 10 wt %, and the plasticizer can be present in the ductility agent in an amount from about 1 wt % to about 35%, based on a total weight of the ductility agent. In another example, a three-dimensional object can be formed including pores having an average diameter from about 1 micrometer to about 1 millimeter, and the presence of the plasticizer and the pores within the three-dimensional object can provide ductility to the three-dimensional object that is greater than provided by the plasticizer without the presence of the pores.

It is noted that when discussing examples of multi-fluid kits, three-dimensional printing kits, three-dimensional printed objects, and methods of three-dimensional printing, such discussions can be considered applicable to one another whether or not they are explicitly discussed in the context of that example. Thus, for example, when discussing a plasticizer used in a multi-fluid kit, such disclosure is also relevant to and directly supported in the context of a three-dimensional printing kit, a three-dimensional printed object, or a method of three-dimensional printing, and vice versa.

Terms used herein will have the ordinary meaning in the relevant technical field unless specified otherwise. In some instances, there are terms defined more specifically throughout the specification or included at the end of the present specification, and thus, these terms can have a meaning as described herein.

Multi-Fluid Kits for Three-Dimensional Printing

The multi-fluid kits, three-dimensional printing kits, and methods described herein can be used to make three-dimensional (3D) printed objects that have enhanced ductility. The ductility of the three-dimensional printed object can be adjusted using a ductility agent that includes a pore-generating compound and a certain type of plasticizer. The pore generating compounds described herein can include compounds that react chemically at an elevated temperature to generate a gas. This gas can form pores in the three-dimensional printed material. The plasticizer used in the ductility agent can have a chemical formula that is either formula (I):

(I)

wherein n is an integer ranging from 3 to 8, or formula (II):

(II)

wherein m is an integer ranging from 3 to 8. It has been found that these plasticizers and the pore-generating compounds can have a synergistic effect when used together. These compounds can increase the ductility of the three-dimensional printed material significantly compared to three-dimensional printed objects formed without the use of a ductility agent. Furthermore, using the plasticizer and the pore-generating compound together can produce a larger increase in ductility than the sum of the increase in ductility produced by either compound alone. This indicates an unexpected synergy between these compounds when used together.

In some examples, the ductility agents described herein can be used in a particular type of three-dimensional printing process that involves applying the ductility agent to a powder bed material. In one example, the ductility agent can be selectively applied to a powder bed material that includes polymer particles. A fusing agent can also be selectively applied to the powder bed. The fusing agent can include a radiation absorber that can absorb radiation and convert the radiation to heat. After applying the fusing agent and the ductility agent, the powder bed can be exposed to radiation.

Portions of the powder bed where the fusing agent was applied can heat up to the point that the polymer particles can become fused together to form a solid layer. At the same time, the heat can cause the pore-generating compound in the ductility agent to react and form a gas. In some examples, the gas can become trapped as small bubbles in the molten polymer. When the polymer hardens, the bubbles can remain as pores within the polymer matrix. One effect of this porosity is an increase in ductility of the final three-dimensional printed object. The plasticizer in the ductility agent can also increase the ductility of the three-dimensional printed object.

In some cases, the ductility agent can be applied in the same areas as the fusing agent to make a three-dimensional printed object that has uniform enhanced ductility throughout the object. Alternatively, the ductility agent and the fusing agent may be a single fluid agent that includes the pore-generating compound, the plasticizer, and an electromagnetic radiation absorber in the single fluid agent. This combination fusing/ductility agent can also be used to form a three-dimensional printed object that has enhanced ductility throughout the entire volume of the object. In other examples, the ductility agent can be printed on a limited portion of the area where the fusing agent is printed. This can form a three-dimensional printed object that has a portion with enhanced ductility, and a portion with normal ductility. Any size, shape, and number of portions with enhanced ductility can be designed and produced in the three-dimensional printed object by selectively applying the ductility agent.

As mentioned above, increasing the porosity of the three-dimensional printed material is one way that the ductility agent can adjust the ductility of the material. The methods described herein can allow for the extent of porosity to be controlled and tuned. The pores are formed by a pore-generating compound in the ductility agent. The pore-generating compound can be a compound that chemically reacts to form a gas when the compound is heated to an elevated temperature. In some examples, the level of porosity in the three-dimensional printed object can be adjusted by changing the amount of ductility agent that is applied to the build material. In other examples, the level of porosity can be adjusted by changing the amount of heating provided to the pore-generating compound. For example, the build material with the pore-generating compound applied thereto can be exposed to more intense radiation or exposed for a longer time to supply more heat to the pore-generating compound, and thereby cause more of the pore-generating compound to react to form gas. Accordingly, the methods described herein provide multiple avenues for controlling the porosity level in the three-dimensional printed object.

Figure 1:
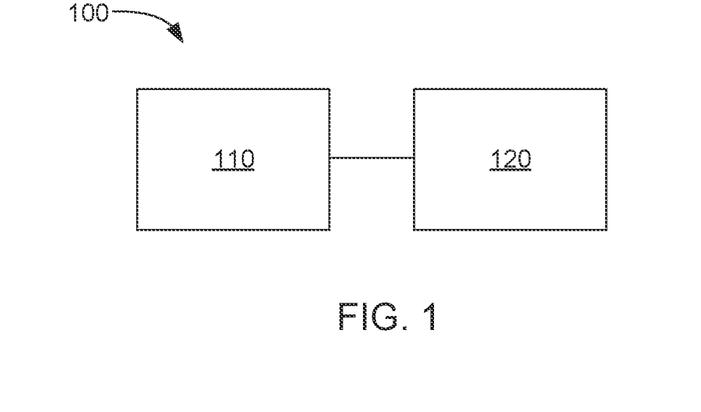
FIG. 1 is a schematic view of an example multi-fluid kit for three-dimensional printing in accordance with examples of the present disclosure.

With this description in mind, FIG. 1 shows a schematic illustration of an example multi-fluid kit for three-dimensional printing 100. The multi-fluid kit includes a fusing agent 110 and a ductility agent 120. The fusing agent can include water and an electromagnetic radiation absorber. The radiation absorber can absorb radiation energy and convert the radiation energy to heat. The ductility agent can include water, a water-soluble pore-generating compound, and a plasticizer. As explained above, the pore-generating compound can chemically react at an elevated temperature to generate a gas. The plasticizer can have either formula (I) or formula (II) as shown above.

As described above, the fusing agent can be applied to a powder bed material in areas that are to be fused to form a layer of a three-dimensional printed object. The ductility agent can be applied to areas of the powder bed where enhanced ductility is desired in the final three-dimensional printed object.

Three-Dimensional Printing Kits

Figure 2:
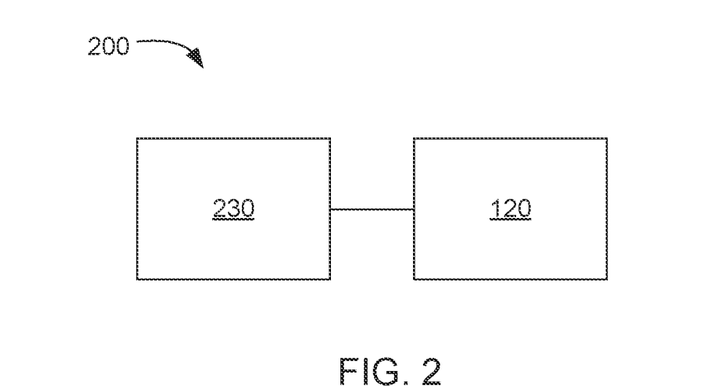
FIG. 2 is a schematic view of an example three-dimensional printing kit in accordance with examples of the present disclosure.

The present disclosure also describes three-dimensional printing kits. In some examples, the three-dimensional printing kits can include materials that can be used in the three-dimensional printing processes described herein. FIG. 2 shows a schematic illustration of one example three-dimensional printing kit 200 in accordance with examples of the present disclosure. The kit includes a powder bed material 230 including polymer particles, and a ductility agent 120 to selectively apply to the powder bed material. The ductility agent can include water, a water-soluble pore-generating compound, and a plasticizer as described above.

In some examples, the ductility agent can act as both a ductility agent and a fusing agent. In such examples, an electromagnetic radiation absorber can be included in the ductility agent. Thus, three-dimensional printed objects can be formed by selectively applying this combined ductility/fusing agent to the powder bed material and fusing the powder bed material that is in contact with the electromagnetic radiation absorber. The combined ductility/fusing agent can also include the pore-generating compound and plasticizer. These ingredients can impart a greater level of ductility to the entire three-dimensional printed object.

In other examples, the three-dimensional printing kit can include a ductility agent and a fusing agent that is separate from the ductility agent. This can allow somewhat more flexibility because the ductility agent can be selectively applied in some portions of the three-dimensional printed object, but not in others. Alternatively, the ductility agent can be applied in different amounts in different portions of the three-dimensional printed object to control the ductility of the material in the different portions of the object. Thus, the ductility agent can be used to control the ductility of the material on a voxel level, independent of the locations where the fusing agent is applied.

Figure 3:
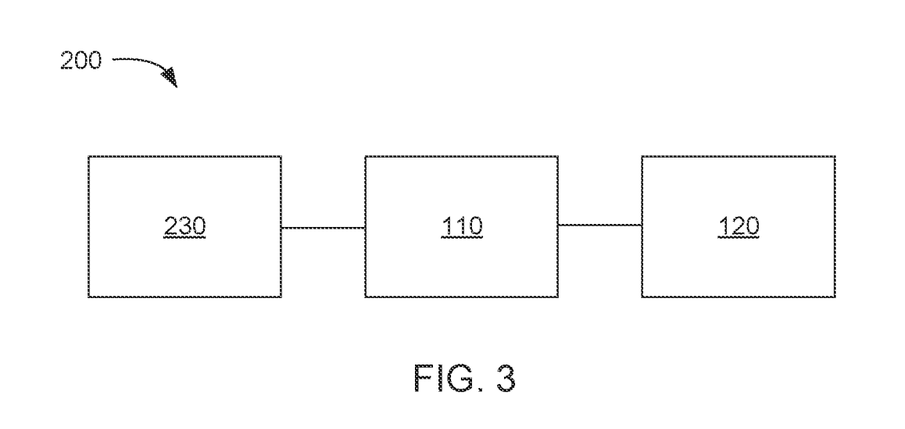
FIG. 3 is a schematic view of another example three-dimensional printing kit in accordance with examples of the present disclosure.

FIG. 3 shows another example three-dimensional printing kit 200. This example includes a powder bed material 230, a fusing agent 110, and a ductility agent 120. The powder bed material can include polymer particles. The fusing agent can include water and an electromagnetic radiation absorber that absorbs radiation energy and converts the radiation energy to heat. The ductility agent can include water, a water-soluble pore-generating compound that chemically reacts at an elevated temperature to generate a gas, and a plasticizer having formula (I) or formula (II) as described above. The electromagnetic energy absorbers and other ingredients that can be included in the fusing agent and the ductility agent are described in more detail below.

Figure 4A:
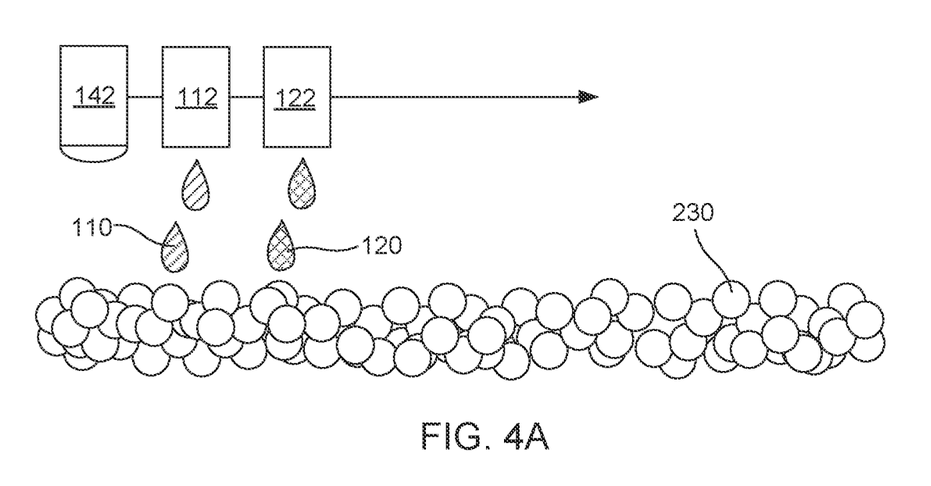
FIGS. 4A-4C show a schematic view of an example three-dimensional printing process using an example multi-fluid kit in accordance with examples of the present disclosure.
Figure 4B:
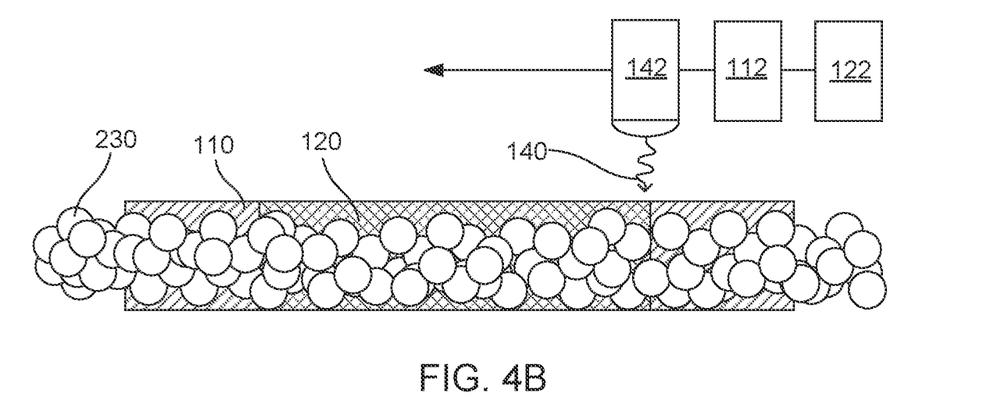
Figure 4C:
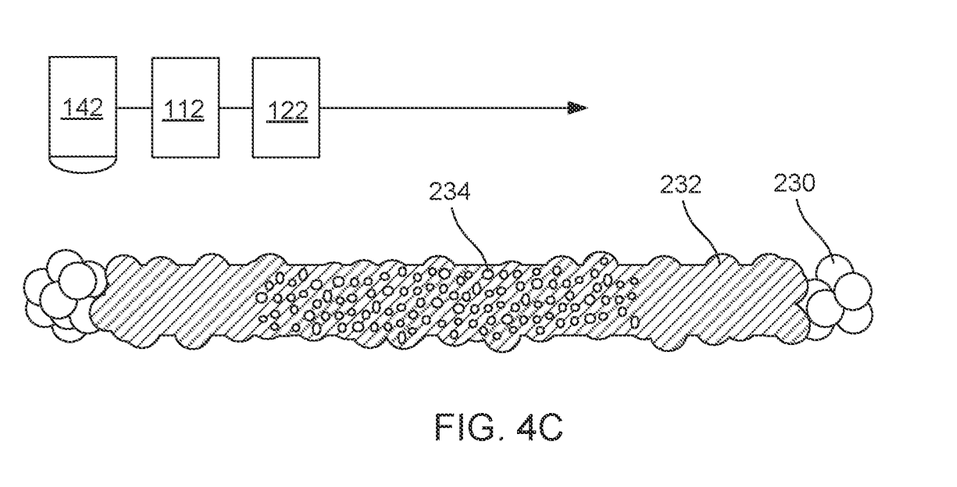

To further illustrate the use of the three-dimensional printing kits, FIGS. 4A-40C illustrate one example of a process that uses a three-dimensional printing kit to form a three-dimensional printed object. In FIG. 4A, a fusing agent 110 and a ductility agent 120 are jetted onto a layer of powder bed material 230 including polymer particles. The fusing agent is jetted from a fusing agent ejector and the ductility agent is jetted from a ductility agent ejector 122. These fluid ejectors can move across the layer of polymer particles to selectively jet fusing agent on areas that are to be fused, while the ductility agent can be jetted onto areas that are to have enhanced ductility. Furthermore, a radiation source 142 can also move across the layer of polymer particles.

FIG. 4B shows the layer of powder bed material 230, which includes polymer particles, after the fusing agent 110 has been jetted onto an area of the layer that is to be fused. Additionally, the ductility agent 120 has been jetted onto a portion of the area where the fusing agent was also jetted. In this figure, the radiation source 142 is shown emitting radiation 140 toward the layer of polymer particles. The fusing agent can include a radiation absorber that can absorb this radiation and convert the radiation energy to heat.

FIG. 4C shows the layer of powder bed material 230 including polymer particles with a fused portion 232 where the fusing agent was jetted. This portion has reached a sufficient temperature to fuse the polymer particles together to form a solid polymer matrix. The area where the ductility agent was jetted becomes a portion having enhanced ductility 234. This portion can include pores formed when the pore-generating compound in the ductility agent reacts to form gas when heated. The reaction can form gas bubbles in the molten polymer, and the gas bubbles can become trapped when the polymer re-solidifies to form the solid polymer matrix. The portion where the ductility agent was jetted can also include the plasticizer having formula (I) or formula (II) as described above.

As used herein, "pores" refers to void spaces in the solid polymer matrix. The void spaces may be individual, closed void spaces that are separated from other void spaces by solid polymer. In other examples, the void spaces may be interconnected with other void spaces. Thus, in various examples, depending on the extent of porosity, the pores can range from a fully interconnected network of voids to a collection of discrete, unconnected voids. In further examples, the void spaces can be filled by gas that is generated by a chemical reaction of the pore-generating compound.

As used herein, "porosity" can refer to the presence of pores in the fused polymer matrix. In the context of a specific value, "porosity" can be defined as the volume fraction of void space in the fused polymer with respect to the entire volume of the fused polymer together with the void space. The void space can refer to voids formed by the chemical reaction of the pore-generating compound, and not void spaces designed into the 3D model used to print the object in question. Any geometry designed into the 3D object model can be considered features of the "entire volume of the fused polymer" and the fraction of void space can be based on the voids formed by gas generated by the pore-generating compound. Additionally, porosity can be measured with respect to the entire three-dimensional printed object or with respect to a porous portion of the three-dimensional printed object (where the ductility agent was applied). In some examples, a porous portion of a three-dimensional printed object made using the methods described herein can have a porosity from about 0.5 vol % to about 50 vol %. In further examples, the porous portion can have a porosity from about 1 vol % to about 30 vol % or from about 5 vol % to about 20 vol %. Additionally, the size of the pores can vary. In some examples, the pores can have an average diameter from about 1 micrometer to about 1 millimeter. In further examples, the pores can have an average diameter from about 1 micrometer to about 500 micrometers, or from about 2 micrometers to about 300 micrometers or from about 5 micrometers to about 50 micrometers.

In some examples, the increased porosity caused by the pore-generating compound can also increase the ductility of the three-dimensional printed material. As explained above, the ductility agent can also include a plasticizer that can have a synergistic effect with the pore-generating compound. The combination of the pore-generating compound and the plasticizer can produce a greater increase in ductility compared to when either of these compounds is used alone. As used herein, the term "ductility" refers to the ability of a material be drawn out by a tensile force without breaking. Ductile materials may be drawn to a longer length and a narrow cross-section by a tensile force with fracturing. In some cases, the material can be drawn out beyond the elastic region of the material, which is the region in which the material can be deformed and then returned elastically to its original shape when the tensile force is removed. In some examples, ductility can be measured by applying a tensile force to a material and measuring the strain (i.e., the length of the material proportional to the original length) at the point when the material fractures. Materials with a higher ductility can have a higher strain at the breaking point. In some examples, the strain at break can be measured by a testing system such as the INSTRON® tensile tester, available from Instron (USA).

In addition to increasing the ductility of three-dimensional printed material, the ductility agent can also increase the elasticity of the material. As used herein, "elasticity" refers to the ability of a material to deform in response to mechanical stress and then return to the original shape of the material when the stress is removed. In specific examples, the elasticity can be quantified in terms of the Young's modulus. The Young's modulus refers to the ratio of stress (in terms of force per area, such as in units of pascals) to the proportional strain (a unitless measure of the deformation of the material compared to the original shape of the material). A higher Young's modulus is understood to represent a less elastic material. In some examples, the Young's modulus of a material can also be measured by a testing system such as an INSTRON® tensile tester, available from Instron (USA).

Powder Bed Material

In certain examples, the powder bed material can include polymer particles having a variety of shapes, such as substantially spherical particles or irregularly-shaped particles. In some examples, the polymer powder can be capable of being formed into 3D printed objects with a resolution of about 20 µm to about 100 µm, about 30 µm to about 90 µm, or about 40 µm to about 80 µm. As used herein, "resolution" refers to the size of the smallest feature that can be formed on a 3D printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 6,12 powder, thermoplastic polyamide, polyamide copolymer, polyethylene powder, wax, thermoplastic polyurethane powder, acrylonitrile butadiene styrene powder, amorphous polyimide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, polyvinylidene fluoride, polyvinylidene fluoride copolymer, poly(vinylidene fluoride-trifluoroethylene), poly(vinylidene fluoride-trifluoroethylene-chlorotrifluoroethylene), or mixtures thereof. In a specific example, the polymer powder can be polyamide 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the polymer build material. The fusing agent can include a radiation absorber that can absorb radiant energy and convert the energy to heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, the radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments, hi further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanedial.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as TERGITOLT™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Ductility Agents

The ductility agents described herein can include water, a water-soluble pore-generating compound that can chemically react at an elevated temperature to generate a gas, and a plasticizer having either formula (I):

(I)

wherein n is an integer ranging from 3 to 8, or formula (II):

(II)

wherein m is an integer ranging from 3 to 8. As used herein, "chemically react" refers to a change in chemical composition and not a mere phase change from liquid or solid to gas. Many liquid solvents can evaporate to form a gas at an elevated temperature. However, the pore-generating compound described herein does not refer to a liquid that evaporates at the elevated temperature. Instead, the pore-generating compound undergoes a chemical reaction to form a different compound. The product of this chemical reaction can be a gas, and the gas can remain in a gaseous state even after cooling back to room temperature. In some examples, the chemical reaction of the pore-generating compound can proceed without any other reactants besides the pore-generating compound. In certain examples, the pore-generating compound can chemically decompose to form smaller molecules, and the product molecules can include a gas.

Non-limiting examples of pore-generating compounds can include carbohydrazide, urea, methylurea, dimethylurea, a carbamide-containing compound, ammonium carbonate, ammonium nitrate, ammonium nitrite, sodium bicarbonate, potassium bicarbonate, a biuret, and combinations thereof. As used herein, "biuret" refers to both a specific chemical compound named biuret, and a family of compounds that are related to this compound. The specific compound named biuret has the following formula (III):

(III)

The family of compounds related to this compound, which can be referred to as "biurets," include compounds that have the structure of formula (III) but where a hydrogen atom or multiple hydrogen atoms are replaced by alkyl or aryl groups. Examples can include 1,1-dimethylbiuret, 1,5-dimethylbiuret, 1,1-diethyl biuret, trimethylbiuret, etc.

These pore-generating compounds can chemically decompose to form a gas when heated to a decomposition temperature. In some examples, the gas formed can include carbon dioxide gas. In certain examples, the pore-generating compound can react to form a gas at an elevated temperature that is reached during the 3D printing process. In some examples, the elevated temperature at which the pore-generating compound reacts can be from about 100° C. to about 250° C. In further examples, the elevated temperature can be from about 150° C. to about 250° C. or from about 190° C. to about 240° C. In certain examples, the elevated temperature can be at or near the melting or softening point temperature of the polymer particles in the powder bed. For example, the elevated temperature can be within 20° C., within 15° C., or within 10° C. of the melting or softening point of the polymer particles. Thus the pore-generating compound can react when the polymer particles are fused during the three-dimensional printing process. In other examples, the elevated temperature at which the pore-generating compound reacts can be higher than the melting or softening point of the polymer particles. During the three-dimensional printing process, a sufficient amount of fusing agent can be applied to the polymer particles and a sufficient amount of radiation energy can be applied to heat the pore-generating compound to the temperature at which the pore-generating compound will react.

In some cases, the pore-generating compound that is applied to the powder bed can react completely to form gas when the powder bed is heated during fusing of the polymer particles. In other words, all or nearly all of the pore-generating compound can react to yield the gas. In other examples, a portion of the pore-generating compound can react and another portion can remain unreacted. In certain examples, from about 50 wt % to about 100 wt % of the pore-generating compound can react. In other examples, from about 60 wt % to about 95 wt % or from about 70 wt % to about 90 wt % of the pore-generating compound can react. In still further examples, less of the pore-generating compound can react. For example, from about 10 wt % to about 70 wt %, or from about 20 wt % to about 60 wt %, or from about 30 wt % to about 50 wt % of the pore-generating compound can react. The amount of the pore-generating compound that reacts can in some cases depend on the temperature to which the powder bed is heated, the length of time that the powder is held at that temperature, the total amount of radiation energy applied to the powder bed, and so on. Accordingly, in some examples, the amount of radiation energy applied, the length of time that the powder bed is heated, the temperature reached by the powder bed, the amount of fusing agent applied to the powder bed, and other variables can affect the extent of the reaction of the pore-generating compound. Therefore, these variables can affect the porosity of the final three-dimensional printed object. This, in turn, can affect the ductility of the object. These variables can be parts of the "print mode" of the three-dimensional printing process. The porosity can also be affected by changing the amount of ductility agent that is applied to the powder bed. Accordingly, the print mode can be adjusted to affect the level of porosity in the three-dimensional printed object.

The total amount of pore-generating compound that is present in the powder bed can directly affect the porosity of the three-dimensional printed object. As mentioned above, this variable can be adjusted by changing the amount of ductility agent that is applied to the powder bed. Alternatively, the amount of pore-generating compound applied to the powder bed can be changed by changing the concentration of the pore-generating compound in the ductility agent. The amount of pore-generating compound can be selected to allow the ductility agent to be jettable from a fluid jet printhead. In certain examples, the concentration of the pore-generating compound in the ductility agent can be from about 0.5 wt % to about 10 wt % with respect to the total weight of the ductility agent. In further examples, the concentration of pore-generating compound can be from 1 wt % to 8 wt % or from 2 wt % to 7 wt %.

Regarding the plasticizer that can be included in the ductility agent, the plasticizer can be a compound that has formula (I) or formula (II) as described above. Without being bound to a particular mechanism, in some examples the plasticizer can impart ductility to a polymer by reducing the attractive forces between polymer chains in the polymer. In certain examples, the plasticizer can be a compound of formula (I). As mentioned above, in formula (I), n can be an integer from 3 to 8. In some particular examples, n can be 4 or 5. In other examples, the plasticizer can be a compound having formula (II). In this formula, m can also be an integer from 3 to 8. In some particular examples, m can be 5.

Plasticizers having formula (I) can be characterized as an oligomer of 1,3-propanediol or an oligomer of trimethylene glycol. Some examples of commercially available compositions that include such compounds are: the SENSATIS® series, such as SENSATIS® H250; and the VELVETOL® series, such as VELVETOL® H500. These are available from Allessa GmbH (Germany).

Plasticizers having formula (II) can be characterized as an oligomer of 1,4-butanediol, or an oligomer of tetramethylene glycol, or an oligomer of tetrahydrofuran. Some commercially available compositions that include such plasticizers can include the POLYTHF® series from BASF Corp. (Germany) and the POLYMEG® series from LyondellBasell (Netherlands).

In various examples, the plasticizer used in the ductility agent can have a weight average molecular weight from about 192 Mw to about 595 Mw. In further examples, the plasticizer can have a weight average molecular weight from about 250 Mw to about 380 Mw. In some specific examples, the weight average molecular weight of the plasticizer can be about 250 Mw or about 380 Mw. The viscosity of the plasticizer can be from about 100 mPa·s to about 150 mPa·s in some examples. In a particular example, the viscosity can be about 120 mPa·s. These viscosities can be measured at 25° C. The plasticizer can also be soluble in water or in a water-based vehicle. In some examples, the plasticizer can be soluble in water in an amount of 20% or more. In other examples, the plasticizer can be 20% soluble or more in a water-based fluid that includes 25 wt % or more of water.

As mentioned above, the plasticizer can have a synergistic effect when used together with the pore-generating compound. Therefore, the level of ductility that is achieved in the final three-dimensional printed object can be related to the amount of the plasticizer that is applied to the powder bed material during printing. The amount of the plasticizer that is applied to the powder bed material can be controlled by adjusting the amount of ductility agent that is applied to the powder bed material, and also by adjusting the concentration of the plasticizer in the ductility agent. In some examples, the plasticizer can be present in the ductility agent in an amount from about 1 wt % to about 35 wt %, with respect to the total weight of the ductility agent. In other examples, the plasticizer can be present in an amount from about 5 wt % to about 30 wt %, or from about 15 wt % to about 25 wt %, or from about 20 wt % to about 35 wt %, or from about 1 wt % to about 10 wt %, or from about 1 wt % to about 20 wt %. In certain examples, the plasticizer can be present in an amount of about 20 wt % or about 25 wt % or about 30 wt % with respect to the total weight of the ductility agent.

The ductility agent can also include ingredients to allow the ductility agent to be jetted by a fluid jet printhead. In some examples, the ductility agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Additionally, as mentioned above, in some examples the ductility agent can also act as a fusing agent. In these examples, the ductility agent can include an electromagnetic radiation absorber. The electromagnetic radiation absorber can include any of the radiation absorbers described above as being included in the fusing agent. The concentration of the electromagnetic radiation absorber in the ductility agent can also be within any of the concentration ranges described above with respect to the electromagnetic radiation absorber in the fusing agent.

Methods of Three-Dimensional Printing

Figure 5:
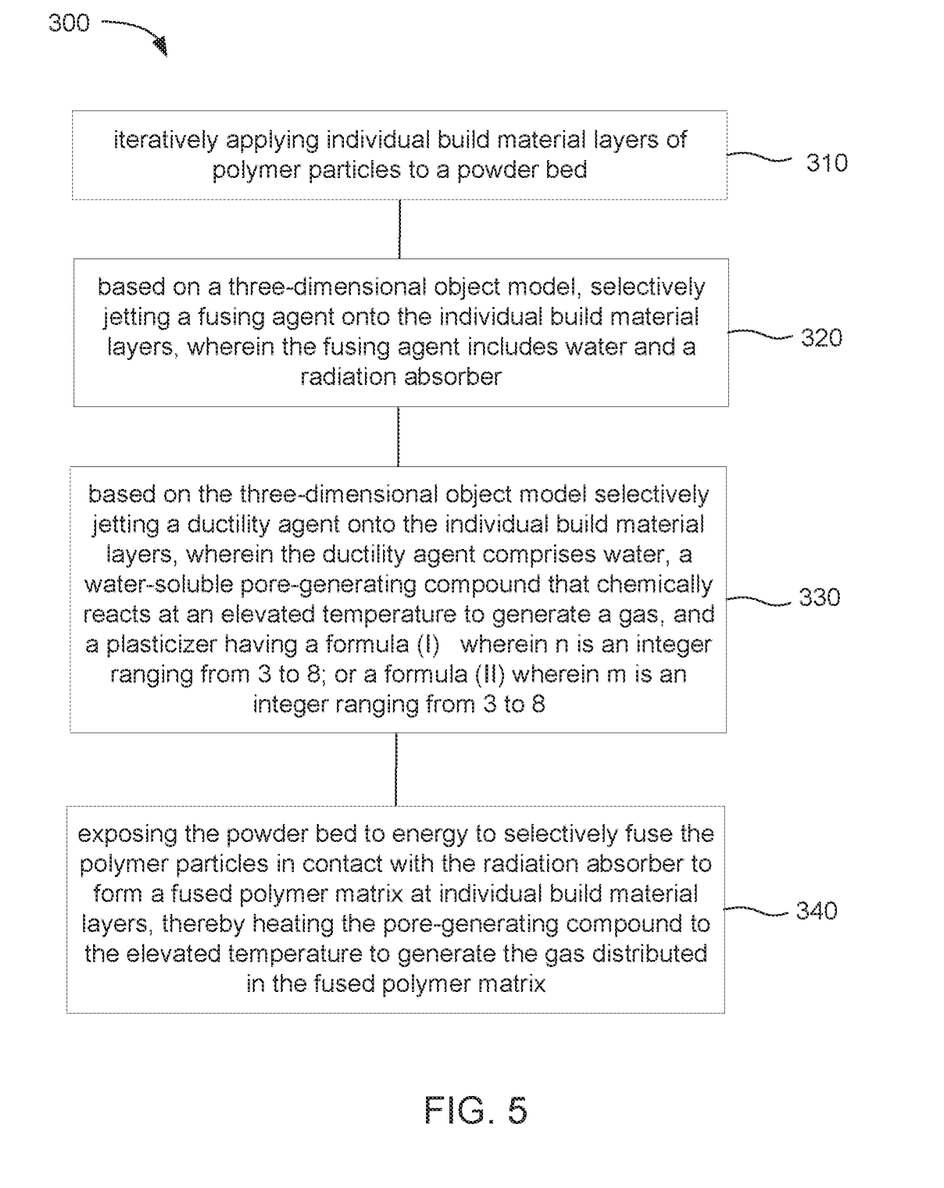
FIG. 5 is a flowchart illustrating an example method of three-dimensional printing in accordance with examples of the present disclosure.

The present disclosure also describes methods of three-dimensional printing. FIG. 5 shows a flowchart illustrating one example method 300 of three-dimensional printing. The method includes: iteratively applying individual build material layers of polymer particles to a powder bed (310); based on a three-dimensional object model, selectively jetting a fusing agent onto the individual build material layers, wherein the fusing agent includes water and a radiation absorber (320); based on the three-dimensional object model selectively jetting a ductility agent onto the individual build material layers, wherein the ductility agent includes water, a water-soluble pore-generating compound that chemically reacts at an elevated temperature to generate a gas, and a plasticizer having:

a formula (I):

wherein n is an integer ranging from 3 to 8; or
a formula (II):

wherein m is an integer ranging from 3 to 8 (330); and exposing the powder bed to energy to selectively fuse the polymer particles in contact with the radiation absorber to form a fused polymer matrix at individual build material layers, thereby heating the pore-generating compound to the elevated temperature to generate the gas distributed in the fused polymer matrix (340).

As mentioned above, in some examples, the elevated temperature at which the pore-generating compound chemically reacts can be from about 100° C. to about 250° C. The pore-generating compound, and the powder bed material onto which the pore-generating compound was jetted, can reach this elevated temperature when the radiation energy is applied to the powder bed. In some examples, the elevated temperature can be at or near the melting or softening point of the polymer particles in the powder bed. In other examples, the elevated temperature can be above or below the melting or softening point of the polymer particles. In any of these examples, the pore-generating compound can be heated to a sufficient temperature to react and form a gas while the polymer particles are in a melted or softened state so that gas bubbles can form in the melted or softened polymer.

Also as mentioned above, a variety of variables of the "print mode" can be adjusted to affect the level of ductility in the three-dimensional printed object. In some examples, the methods of three-dimensional printing can include adjusting these variables to modify the level of ductility. In certain examples, the variables can include the amount of fusing agent applied to the powder bed, the amount of ductility agent applied to the powder bed, the thickness of individual layers of build material, the intensity and duration of radiation applied to the powder bed, the preheating temperature of the powder bed, and so on.

The fusing agent and ductility agent can be jetted onto the powder bed using fluid jet print heads. The amount of ductility agent jetted onto the powder can be calibrated based on the concentration of the pore-generating compound and the plasticizer in the ductility agent, the desired porosity and ductility of the resulting material portion to be printed, among other factors. Similarly, the amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if an individual layer of polymer powder is 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting or softening point. In a particular example, the preheat temperature can be from about 160° C. to about 170° C. and the polymer powder can be polyamide 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure used to coalesce the individual printed layer. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers for from about 0.5 to about 10 seconds per pass.

The three-dimensional printed object can be formed by jetting a fusing agent onto layers of powder bed build material according to a 3D object model. 3D object models can in some examples be created using computer aided design (CAD) software. 3D object models can be stored in any suitable file format. In some examples, a three-dimensional printed object as described herein can be based on a single 3D object model. The 3D object model can define the three-dimensional shape of the object and the three-dimensional shape of portions where enhanced ductility is desired in the three-dimensional printed object. In other examples, the object can be defined by a first 3D object model and the portions of the object where the ductility is enhanced can be defined by a second 3D object model. Other information may also be included, such as structures to be formed of additional different materials or color data for printing the object with various colors at different locations on the object. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of the pore-generating compound, and so on. All this information can be contained in a single 3D object file or a combination of multiple files. The three-dimensional printed object can be made based on the 3D object model. As used herein, "based on the 3D object model" can refer to printing using a single 3D object model file or a combination of multiple 3D object models that together define the object. In certain examples, software can be used to convert a 3D object model to instructions for a 3D printer to form the object by building up individual layers of build material.

In an example of the three-dimensional printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete three-dimensional object is printed. Thus, "applying individual build material layers of polymer particles to a powder bed" also includes spreading layers of polymer particles over the loose particles and fused layers beneath the new layer of polymer particles.

In certain examples, the three-dimensional printed object can be formed with porosity throughout the three-dimensional printed object, or with a porous portion of any desired shape located in any desired location within the three-dimensional printed object. In one example, the three-dimensional printed object can have a porous interior and a solid exterior surface. For example, the three-dimensional printed object can be designed to have a solid layer or shell without any of the pore-generating compound present and then an interior portion where the ductility agent that includes the pore-generating compound is applied. In some examples, the solid shell can be from about 20 micrometers to about 2,000 micrometers thick, or any other desired thickness. In further examples, the ductility agent can be applied in certain portions of the three-dimensional printed object to form more flexible portions of the object. In certain examples, the object can include a flexible portion or multiple flexible portions that connect more rigid segments of the object that do not include the ductility agent. Besides these examples, three-dimensional printed objects with portions of enhanced ductility can be used for a variety of additional applications.

In some particular examples, three-dimensional printed objects that are made using the methods described herein can include pores formed from the pore-generating compound and the plasticizer having formula (I) or formula (II) as described above. The presence of the plasticizer and the pores in the three-dimensional object can provide ductility to the three-dimensional object that is greater than provided by the plasticizer without the presence of the pores. As mentioned above, one specific property that can correspond to a higher ductility is an increased strain at the breaking point. Three-dimensional printed objects made using the methods described herein can have a greater strain and break compared to objects that include the plasticizer alone, or objects that include the pore-generating compound alone.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" includes pigment colorants, magnetic particles; aluminas, silicas, and/or other ceramics, organo-metallics or other opaque particles, whether or not such particulates impart color. Thus, though the present description primarily exemplifies the use of pigment colorants, the term "pigment" can be used to describe pigment colorants, and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a lithe above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if a numerical value and sub-range is explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Ductility Agent Formulation

An example ductility agent was prepared. The ductility agent included both a pore-generating compound (urea) and a plasticizer (SENSATIS® H250 from Allessa GmbH, Germany). Two control agents were also prepared for comparison. Control Agent A included the plasticizer without the pore-generating compound, and Control Agent B included the pore-generating compound without the plasticizer. The amount of urea and SENSATIS® H250 in the respective agents was between 1 and 30 wt %. The remaining ingredients in these agents are shown in Table 1. The agents also included TERGITOL™ 15-S-9 surfactant, which is available from Dow Chemical (Michigan).

TABLE 1

| Ingredient | Ductility Agent (wt %) | Control Agent A (wt %) | Control Agent B (wt %) |
| --- | --- | --- | --- |
| Propylene glycol (cosolvent) | 30 | 30 | 30 |
| Urea (pore-generating compound) | 1-30 | 0 | 1-30 |
| SENSATIS ® H250 (plasticizer) | 1-30 | 1-30 | 0 |
| EDTA - disodium salt (chelating agent) | 0.03 | 0.03 | 0.03 |
| Sodium bicarbonate (pH adjustment) | 0.03 | 0.03 | 0.03 |
| TERGITOL ™ 15-S-9 (surfactant) | 0.8 | 0.8 | 0.8 |
| Water | Balance | Balance | Balance |

TABLE 1-continued

Example 2-2D and 3D Printing

The example ductility agent and the control agents were first loaded in a 2D inkjet printer to ensure the jettability of the agents. A small amount of magenta dye was added to the agents to allow the printability to be evaluated visually. The agents were used to print a test pattern on paper using the 2D inkjet printer. The example ductility agent and the control agents were successfully printed. Therefore, it is expected that the agents are suitable for use in three-dimensional printing systems that use similar fluid jet print heads.

The example ductility agent and the control agents were then loaded in a test three-dimensional printing system. The system used polyimide 12 powder as a powder bed material. The system also used a fusing agent that included a carbon black pigment as an electromagnetic radiation absorber. A series of dogbone-shaped objects were printed using the three-dimensional printing system. One set of objects was printed by applying the fusing agent and the example ductility agent together throughout the entire volume of the objects. Thus, the objects included a substantially homogeneous distribution of the ductility agent throughout the objects. Additional sets of objects were printed using Control Agent A and Control Agent B for comparison. Another set of objects was also printed using a detailing agent instead of the ductility agent. The detailing agent is a fluid agent that is used to cool the powder bed material, and the detailing agent did not include any plasticizer or pore-generating compound.

Figure 6:
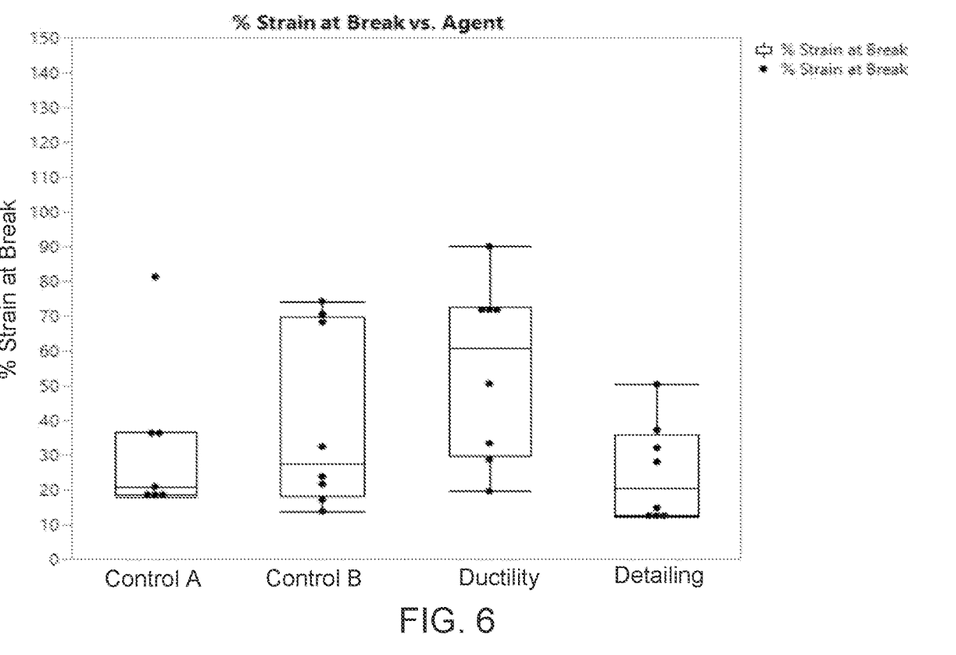
FIG. 6 is a graph of % strain at break for three-dimensional printed objects made using an example ductility agent and control agents.
Figure 7:
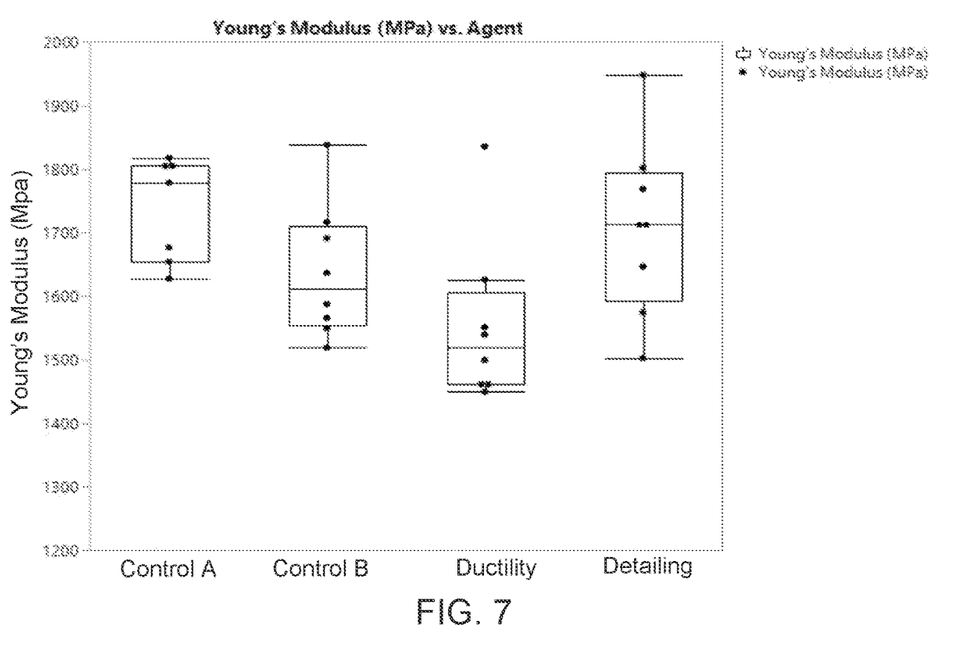
FIG. 7 is a graph of Young's modulus for three-dimensional printed objects made using an example ductility agent and control agents.
Figure 8:
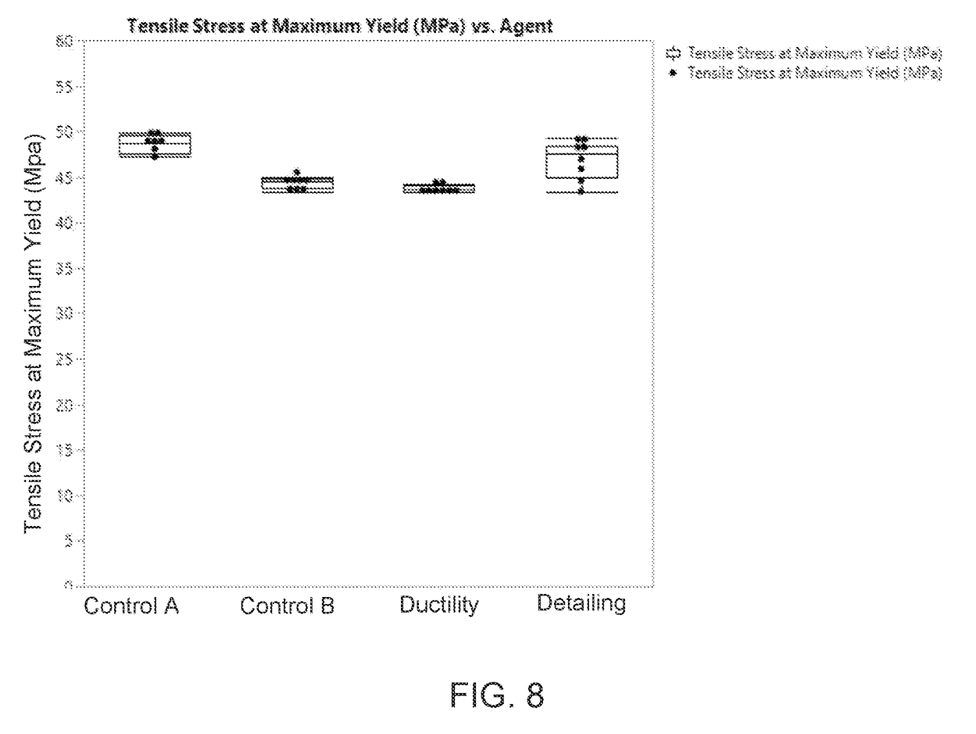
FIG. 8 is a graph of tensile stress at maximum yield for three-dimensional printed objects made using an example ductility agent and control agents.

Several properties of the three-dimensional printed objects were measured. These properties included "% Strain at Break," which is the elongation of the object when the object breaks under tensile stress, in terms of percent of the original length of the object; Young's Modulus, which is in units of MPa; and "Tensile Stress at Maximum Yield," which is the ultimate tensile strength in units of MPa. The properties were measured using an INSTRON® tensile tester, available from Instron (USA). The measurements of these properties are shown in FIGS. 6, 7, and 8, respectively.

The measurements of strain at break show that the example ductility agent provided a greater strain and break than either of the control agents or the detailing agent. The strain at break is much higher with the ductility agent than with Control Agent A, which included the plasticizer alone. The Young's Modulus measurements show that the ductility agent provides a much lower Young's Modulus than either of the control agents or the detailing agent. This indicates that the objects printed with the ductility agent are more elastic. The tensile stress at maximum yield measurements show that some loss in strength is observed with the ductility agent, but overall this would be expected given the expected lower weight of the objects that could be due to introducing pores and the overall increase in elongation.

What is claimed is:

1. A multi-fluid kit for three-dimensional printing comprising:
    a fusing agent comprising water and an electromagnetic radiation absorber, wherein the electromagnetic radiation absorber absorbs radiation energy and converts the radiation energy to heat; and
    a ductility agent comprising water, a water-soluble pore-generating compound that chemically reacts at an elevated temperature to generate a gas, and a plasticizer having:
    a formula (I):

(I)

wherein n is an integer ranging from 3 to 8; or
    a formula (II):

(II)

wherein m is an integer ranging from 3 to 8.

2. The multi-fluid kit of claim 1, wherein the pore-generating compound is carbohydrazide, urea, methylurea, dimethylurea, a carbamide-containing compound, ammonium carbonate, ammonium nitrate, ammonium nitrite, sodium bicarbonate, potassium bicarbonate, a biuret, or a combination thereof.

3. The multi-fluid kit of claim 1, wherein the elevated temperature at which the pore-generating compound chemically reacts is from about 70° C. to about 250° C.

4. The multi-fluid kit of claim 1, wherein the pore-generating compound is present in the ductility agent in an amount from about 0.5 wt % to about 10 wt %, based on a total weight of the ductility agent.

5. The multi-fluid kit of claim 1, wherein the plasticizer has formula (I) and wherein n is 4 or 5.

6. The multi-fluid kit of claim 1, wherein the plasticizer has formula (II) and wherein m is 5.

7. The multi-fluid kit of claim 1, wherein the plasticizer is present in the ductility agent in an amount from about 1 wt % to about 35 wt %, based on a total weight of the ductility agent.

8. A three-dimensional printing kit comprising:
    a powder bed material comprising polymer particles; and
    a ductility agent comprising water, a water-soluble pore-generating compound that chemically reacts at an elevated temperature to generate a gas, and a plasticizer having:
    a formula (I):

(I)

wherein n is an integer ranging from 3 to 8; or
    a formula (II):

(II)

wherein m is an integer ranging from 3 to 8.

9. The three-dimensional printing kit of claim 8, wherein the polymer particles comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof.

10. The three-dimensional printing kit of claim 8, wherein the pore-generating compound is carbohydrazide, urea, methylurea, dimethylurea, a carbamide-containing compound, ammonium carbonate, ammonium nitrate, ammonium nitrite, sodium bicarbonate, potassium bicarbonate, a biuret, or a combination thereof, and wherein the pore-generating compound is present in the ductility agent in an amount from about 0.5 wt % to about 10 wt %, based on a total weight of the ductility agent.

11. The three-dimensional printing kit of claim 8, wherein the plasticizer has formula (I) and n is 4 or 5, or the plasticizer has formula (II) and m is 5, and wherein the plasticizer is present in the ductility agent in an amount from about 1 wt % to about 35%, based on a total weight of the ductility agent.

12. The three-dimensional printing kit of claim 8, wherein the ductility agent further comprises an electromagnetic radiation absorber, or wherein the three-dimensional printing kit further comprises a fusing agent comprising water and an electromagnetic radiation absorber, wherein the electromagnetic radiation absorber absorbs radiation energy and converts the radiation energy to heat.

13. A method of three-dimensional printing comprising:
    iteratively applying individual build material layers of polymer particles to a powder bed;
    based on a three-dimensional object model, selectively jetting a fusing agent onto the individual build material layers, wherein the fusing agent comprises water and a radiation absorber;
    based on the three-dimensional object model selectively jetting a ductility agent onto the individual build material layers, wherein the ductility agent comprises water, a water-soluble pore-generating compound that chemically reacts at an elevated temperature to generate a gas, and a plasticizer having:
    a formula (II):

(I)

wherein n is an integer ranging from 3 to 8; or
    a formula (II):

(II)

wherein m is an integer ranging from 3 to 8; and
    exposing the powder bed to energy to selectively fuse the polymer particles in contact with the radiation absorber to form a fused polymer matrix at individual build material layers, thereby heating the pore-generating compound to the elevated temperature to generate the gas distributed in the fused polymer matrix.

14. The method of claim 13, wherein the pore-generating compound is carbohydrazide, urea, methylurea, dimethylurea, a carbamide-containing compound, ammonium carbonate, ammonium nitrate, ammonium nitrite, sodium bicarbonate, potassium bicarbonate, a biuret, or a combination thereof, wherein the pore-generating compound is present in the ductility agent in an amount from about 0.5 wt % to about 10 wt %, and wherein the plasticizer is present in the ductility agent in an amount from about 1 wt % to about 35%, based on a total weight of the ductility agent.

15. The method of claim 13, wherein a three-dimensional object is formed including pores having an average diameter from about 1 micrometer to about 1 millimeter, wherein presence of the plasticizer and the pores within the three-dimensional object provides ductility to the three-dimensional object that is greater than provided by the plasticizer without the presence of the pores.

* * * * *